United States Patent
Stewart (10) Patent No.: US 9,596,182 B2
(45) Date of Patent: Mar. 14, 2017

(54) CONTROLLING NON-CONGESTION CONTROLLED FLOWS

(71) Applicant: Adara Networks, Inc., San Jose, CA (US)

(72) Inventor: Randall Stewart, Chapin, SC (US)

(73) Assignee: Adara Networks, Inc., San Jose, CA (US)

( * ) Notice: Subject to any disclaimer, the term of this patent is extended or adjusted under 35 U.S.C. 154(b) by 69 days.

(21) Appl. No.: 13/765,586

(22) Filed: Feb. 12, 2013

(65) Prior Publication Data

US 2014/0226469 A1   Aug. 14, 2014

(51) Int. Cl.
*H04L 12/801* (2013.01)
*H04L 12/813* (2013.01)
*H04L 12/823* (2013.01)

(52) U.S. Cl.
CPC .............. *H04L 47/12* (2013.01); *H04L 47/20* (2013.01); *H04L 47/19* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 5,732,087 A * | 3/1998 | Lauer et al. | 370/416 |
| 6,285,658 B1 * | 9/2001 | Packer | 370/230 |
| 6,889,181 B2 * | 5/2005 | Kerr | H04L 45/00 370/235 |
| 6,996,062 B1 * | 2/2006 | Freed et al. | 370/235 |
| 7,106,756 B1 * | 9/2006 | Donovan et al. | 370/468 |
| 7,307,999 B1 | 12/2007 | Donaghey | |
| 7,447,204 B2 * | 11/2008 | Narvaez | 370/389 |
| 7,453,798 B2 | 11/2008 | Bradford et al. | |
| 7,512,122 B1 * | 3/2009 | Olakangil et al. | 370/389 |
| 7,768,919 B1 * | 8/2010 | Conway | 370/232 |
| 7,774,456 B1 * | 8/2010 | Lownsbrough et al. | 709/224 |
| 7,779,126 B1 * | 8/2010 | Cheriton | 709/226 |
| 7,945,658 B1 * | 5/2011 | Nucci et al. | 709/224 |
| 8,363,548 B1 * | 1/2013 | Aboul-Magd et al. | 370/235 |
| 8,588,056 B1 * | 11/2013 | Choi et al. | 370/216 |
| 8,693,344 B1 * | 4/2014 | Adams | H04L 49/65 370/241 |
| 8,959,203 B1 | 2/2015 | Miller et al. | |
| 2003/0061263 A1 * | 3/2003 | Riddle | 709/104 |
| 2003/0167381 A1 * | 9/2003 | Herscovich et al. | 711/151 |
| 2005/0046453 A1 | 3/2005 | Jiang | |
| 2005/0053070 A1 * | 3/2005 | Jouppi | 370/395.3 |
| 2005/0100006 A1 | 5/2005 | Scott et al. | |
| 2005/0157728 A1 * | 7/2005 | Kawano et al. | 370/395.21 |

(Continued)

OTHER PUBLICATIONS

Allman, et al., "TCP Congestion Control," Apr. 1999, RFC 2581, Standards Track, The Internet Society, pp. 1-14.

(Continued)

*Primary Examiner* — Bunjob Jaroenchonwanit
(74) *Attorney, Agent, or Firm* — Blakely, Sokoloff, Taylor & Zafman LLP (57) ABSTRACT

A packet is received. A flow associated with the packet is determined. An access control ("AC") policy for the flow is determined. The flow in a flow set is organized for transmission based at least on the AC policy. A bandwidth for the flow is monitored. The flow is marked for transmission based on the monitoring.

42 Claims, 7 Drawing Sheets

(56) References Cited

U.S. PATENT DOCUMENTS

| | | | |
|---|---|---|---|
| 2005/0182833 A1 | 8/2005 | Duffie et al. | |
| 2005/0195813 A1* | 9/2005 | Ambe et al. | 370/389 |
| 2006/0075093 A1* | 4/2006 | Frattura et al. | 709/224 |
| 2006/0149845 A1* | 7/2006 | Malin et al. | 709/228 |
| 2006/0159088 A1* | 7/2006 | Aghvami | H04L 45/24 370/389 |
| 2006/0159098 A1* | 7/2006 | Munson et al. | 370/394 |
| 2007/0091893 A1* | 4/2007 | Yazaki et al. | 370/392 |
| 2007/0127483 A1* | 6/2007 | Gilon et al. | 370/392 |
| 2007/0147320 A1* | 6/2007 | Sattari et al. | 370/338 |
| 2007/0208854 A1 | 9/2007 | Wiryaman et al. | |
| 2008/0020775 A1* | 1/2008 | Willars | 455/445 |
| 2008/0056267 A1* | 3/2008 | Hill | H04L 45/302 370/392 |
| 2008/0101376 A1* | 5/2008 | Do et al. | 370/395.21 |
| 2008/0130558 A1* | 6/2008 | Lee et al. | 370/329 |
| 2009/0034428 A1* | 2/2009 | Jeong | 370/252 |
| 2009/0279434 A1 | 11/2009 | Aghvami et al. | |
| 2009/0323690 A1* | 12/2009 | Lu et al. | 370/392 |
| 2010/0046452 A1* | 2/2010 | Kim et al. | 370/329 |
| 2010/0067380 A1* | 3/2010 | Teng | 370/235 |
| 2010/0098414 A1 | 4/2010 | Kramer et al. | |
| 2010/0118883 A1* | 5/2010 | Jones et al. | 370/412 |
| 2010/0138919 A1 | 6/2010 | Peng et al. | |
| 2010/0211637 A1 | 8/2010 | Borzsei et al. | |
| 2010/0250743 A1* | 9/2010 | Memon et al. | 709/224 |
| 2010/0278189 A1* | 11/2010 | Soon | 370/412 |
| 2010/0325701 A1* | 12/2010 | Sun | 726/4 |
| 2011/0158095 A1* | 6/2011 | Alexander | H04L 47/805 370/232 |
| 2011/0205931 A1* | 8/2011 | Zhou et al. | 370/253 |
| 2011/0222406 A1 | 9/2011 | Persson | |
| 2011/0312283 A1 | 12/2011 | Rodbro et al. | |
| 2011/0321123 A1* | 12/2011 | Ishikawa | 726/1 |
| 2012/0016970 A1* | 1/2012 | Shah et al. | 709/220 |
| 2012/0033553 A1* | 2/2012 | Strulo | H04L 47/10 370/232 |
| 2012/0108200 A1 | 5/2012 | Rubin et al. | |
| 2012/0195200 A1 | 8/2012 | Regan | |
| 2012/0195201 A1 | 8/2012 | Ishikawa | |
| 2012/0311658 A1* | 12/2012 | Dozier | 726/1 |
| 2013/0003554 A1* | 1/2013 | Aybay et al. | 370/235 |
| 2013/0021906 A1* | 1/2013 | Rahman et al. | 370/235 |
| 2013/0058248 A1 | 3/2013 | Singh et al. | |
| 2013/0100955 A1 | 4/2013 | Dunlap | |
| 2013/0117766 A1 | 5/2013 | Bax | |
| 2013/0124707 A1* | 5/2013 | Ananthapadmanabha | H04L 49/3009 709/223 |
| 2013/0132952 A1* | 5/2013 | Shah | 718/1 |
| 2013/0157585 A1 | 6/2013 | Naruszewicz | |
| 2013/0159521 A1 | 6/2013 | Marocchi et al. | |
| 2013/0198794 A1 | 8/2013 | Dharmapurikar | |
| 2013/0204965 A1* | 8/2013 | Masputra | H04L 47/60 709/217 |
| 2013/0215754 A1* | 8/2013 | Tripathi et al. | 370/236 |
| 2013/0223438 A1 | 8/2013 | Tripathi et al. | |
| 2013/0242983 A1* | 9/2013 | Tripathi et al. | 370/355 |
| 2013/0254375 A1 | 9/2013 | Agiwal et al. | |
| 2013/0279334 A1* | 10/2013 | Xu et al. | 370/235 |
| 2013/0294384 A1 | 11/2013 | Moulsley et al. | |
| 2013/0301659 A1 | 11/2013 | Schemmann et al. | |
| 2013/0329747 A1 | 12/2013 | Walid et al. | |
| 2014/0094159 A1* | 4/2014 | Raleigh et al. | 455/418 |
| 2014/0140213 A1* | 5/2014 | Raleigh et al. | 370/235 |
| 2014/0150014 A1* | 5/2014 | Aitken et al. | 725/33 |
| 2014/0156863 A1 | 6/2014 | Gao et al. | |
| 2014/0180818 A1 | 6/2014 | Mistler et al. | |
| 2014/0241164 A1* | 8/2014 | Cociglio et al. | 370/235 |
| 2014/0259147 A1 | 9/2014 | L'Heureux et al. | |
| 2014/0293793 A1 | 10/2014 | Racz et al. | |
| 2015/0319647 A1* | 11/2015 | Kekki | H04W 36/14 370/236 |

OTHER PUBLICATIONS

Floyd, et al., "Random Early Detection (RED) gateways for Congestion Avoidance," Aug. 4, 1993, IEEE/ACM Transactions on Networking 1 (4), pp. 397-413.

Stewart, et al., "Stream Control Transmission Protocol (SCTP): A Reference Guide" Nov. 2, 2001, Chapter 6, "Congestion Control and Avoidance", Addison-Wesley Professional, 8 pages.

\* cited by examiner

| Flow ID 301 | Arrival Time 302 | Bandwidth 303 | Priority 304 | Penalty box 305 | Path assignment 306 | AC policy ID 307 |
|---|---|---|---|---|---|---|
| Flow A | t1 | BW1 | N | N | P 1 | AC 1 |
| Flow B | t2 | BW2 | N-1 | | P 2 | AC 2 |
| ... | ... | ... | ... | ... | ... | ... |
| Flow N | tn | BWn | 1 | Y | P n | AC N |

CONTROLLING NON-CONGESTION CONTROLLED FLOWS

CROSS REFERENCE TO RELATED APPLICATION

The present patent application is related to U.S. patent application Ser. No. 13/765,611 filed Feb. 12, 2013, entitled, "CONTROLLING CONGESTION CONTROLLED FLOWS."

FIELD

Embodiments of the present invention relate to networking, and more particularly, to controlling data flows.

BACKGROUND

A router is a device that forwards data packets between computer networks, creating an overlay internetwork. A data packet is forwarded from one router to another through the networks that constitute the internetwork until it gets to its destination node. Routers on the internet may control traffic. The act of dropping packets to "slow" down flows is called shaping and policing.

Most modern routers use queues to segregate traffic. The router may use upon the queue a number of Advanced Queue Management ("AQM") techniques. One of the existing AQM techniques to control traffic is called a drop tail technique. This technique involves dropping all incoming packets when a queue becomes full. When the packets exit the queue and the queue size lowers, then incoming packets are admitted. Another one of the AQM techniques is called a Random Early Detection ("RED") technique. According to the RED technique, a queue threshold is set at two levels. When the queue reaches the first threshold, the packets are randomly dropped. Once the queue reaches the second threshold then all incoming packets are dropped, as in the drop tail technique.

For the above-mentioned AQM techniques, the routers have no knowledge or awareness of the traffic that they are dropping. For non-congestion controlled flows, such as streaming video, as the number of users increases, all packets start dropping. This typically results in a poor video (e.g., choppy frames, or video freezing) for every user. Ultimately this can lead to a situation when none of the users see video. As a number of users increases, the existing techniques may not maintain a quality data traffic throughput.

SUMMARY OF THE DESCRIPTION

Exemplary embodiments of methods and apparatuses to control non-congestion controlled flows are described. For at least some embodiments, a packet is received. A flow associated with the packet is determined. An access control ("AC") policy for the flow is determined. The flow in a flow set is organized for transmission based at least on the AC policy.

For at least some embodiments, the access control policy is assigned to the flow. A bandwidth for the flow is monitored. The flow is marked for transmission based on monitoring of the bandwidth.

For at least some embodiments, the AC policy assigned to the flow is associated with at least one of a bandwidth and a priority rank. The flow is defined based on at least one of an Internet Protocol ("IP") source address, an IP destination address, a source port address, a destination port address; a Media Access Control ("MAC") source address, a MAC destination address, type of service ("TOS") data also called a Differentiated Services Code Point ("DSCP") data. An arrival time for the flow is determined. The flow in the flow set is organized for transmission based on the arrival time. The flow is removed from the flow set.

For at least some embodiments, a number of flows in a flow set are monitored. The flows are defined based on at least one of an Internet Protocol ("IP") source address, an IP destination address, a source port address, a destination port address; a Media Access Control ("MAC") source address, a MAC destination address, type of service ("TOS") data sometimes called a Differentiated Services Code Point ("DSCP") data.

For at least some embodiments, the number of flows in the flow set is matched against an access control ("AC") policy threshold. The packet associated with the flow is transmitted based at least on matching the flows against the AC policy threshold. The AC policy is associated with at least one of a bandwidth; and a priority rank. A bandwidth for the flow set is monitored. An arrival time for the flow in the flow set is determined. The flow in the flow set is marked for transmission. The packet is transmitted based on the arrival time. The packet associated with the flow is discarded.

Other features of embodiments of the invention will be apparent from the accompanying drawings and from the detailed description which follows.

BRIEF DESCRIPTION OF DRAWINGS

Embodiments of the present invention are illustrated by way of example and not limitation in the figures of the accompanying drawings in which like references indicate similar elements.

DETAILED DESCRIPTION

Exemplary embodiments of methods and apparatuses to control non-congestion controlled flows are described. For at least some embodiments, a packet is received. A flow associated with the packet is determined. An access control ("AC") policy for the flow is determined. The flow in a flow set is organized for transmission based at least on the AC policy.

Exemplary embodiments described herein assure that at least some set of users receive a good quality service for their media (e.g., a video streaming, an audio streaming, or both). For one embodiment, to provide better quality of service to a set of data flows, access control ("AC") policies are assigned to a flow set. IP addresses, ports, MAC-addresses and other parts of the header can be used to define the flow sets. These flow sets are then matched against their priority and an assigned AC policy to control traffic.

Figure 1:
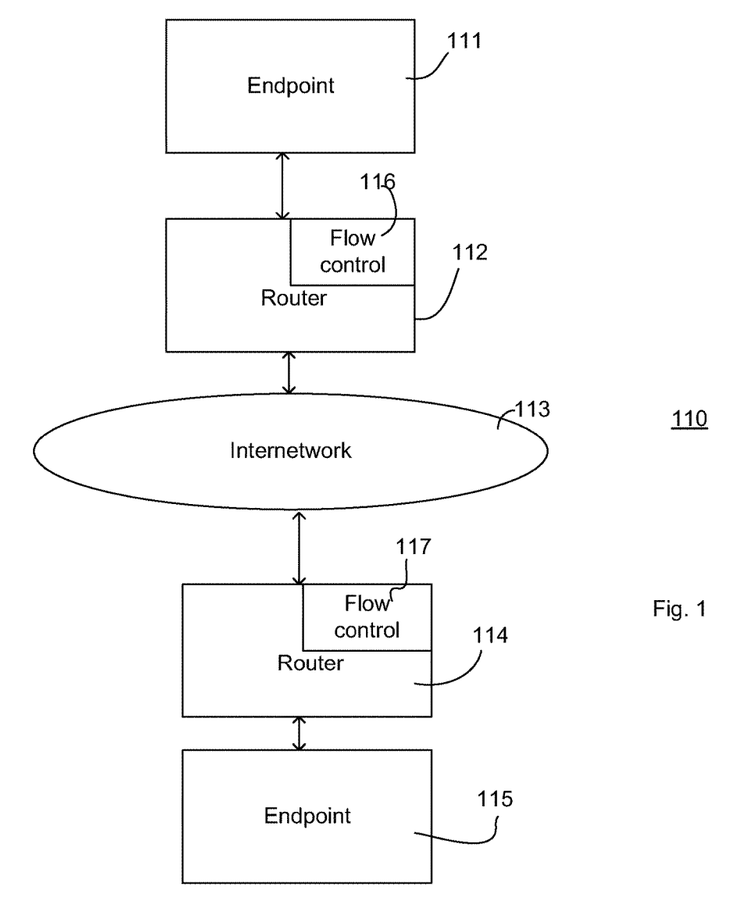
FIG. 1 illustrates an exemplary network to control non-congestion controlled flows according to one embodiment of the invention.

FIG. 1 illustrates an exemplary network 110 to control non-congestion controlled flows according to one embodiment of the invention. As shown in FIG. 1, the network 110 includes network devices, e.g., an endpoint device 111 that can act for example as a source device to transmit data, one or more routers (e.g., a router 112 and a router 114) to forward the data along a network path, and an endpoint device 115 that can act for example as a destination device to receive the data. For one embodiment, the network path includes an internetwork (e.g., an internetwork 113) including a plurality of routers that forward data along a plurality of network paths (e.g., the Internet). The routers 112 and 114 create an overlay network along the network path. Generally, a router can be connected to data paths from a plurality of networks. Generally, when a data packet comes on a data path, the router reads the address information in the packet to determine its destination. Then, using information from a routing table stored in a memory, the router directs the packet to a next network. Generally, the router can set a policy as to how much bandwidth a given set of traffic is allowed to have. If the traffic presented is over those limits the router begins to drop traffic.

All the routers in the network are interconnected to send packets from one host to another. Typically, a host can be a client or a server depending on what role it is serving. Typically, the routers have their own queues that they run to control traffic flow.

As shown in FIG. 1, routers 112 and 114 have flow control units, such as a flow control unit 116 and a flow control unit 117 to control non-congestion controlled flows, as described herein. All data flows going through a network device are being tracked by a flow control unit, e.g., flow control unit 116, flow control unit 117 so that when the data flows come in to the network device the flows are ordered according to a priority rank assigned to the flows and according to the time they came in to the network device. For at least some embodiments, the data flow having a high priority rank is given more priority than the data flow having a low priority rank. For at least some embodiments, if incoming flows have the same priority ranks, the flows are ordered according to their arrival times. For example, if video calls are coming into the network device, such as router 112, router 114, and the like, all these video calls are given the bandwidths according to their access control ("AC") policies to pass through the network device. As an additional call is added, and an overall bandwidth occupied by the video calls becomes greater than a predetermined bandwidth, this additional call starts getting dropped. For one embodiment, if the overall bandwidth occupied by the video calls is greater than a predetermined threshold, the additional calls coming later into the network device are blocked, while the video calls that came into the network device earlier still get their bandwidths based on their AC policies. That is, the data flows that come late are dropped, while the flows that come early are given the bandwidths according to their AC policies to be transmitted by the network device. As one of the earlier flows drops off, the flow that comes later is now given the bandwidth according to its AC policy.

An advantage to the embodiments described herein allows to maintain non-congestion controlled flows under an AC policy so that early arriving flows get the full bandwidth they want (within their AC policy) so the users receiving these flows still have a quality media content streaming (e.g., video, audio, or both). For at least some embodiments, later arriving flows receive no bandwidth until such time that the earlier arrived flows exit. This assures that a network will provide quality content (e.g., videos, audio, or both) for the non-congestion controlled protocols that arrive first.

For one embodiment, the flow control unit, such as flow control unit 116 and flow control unit 117 comprises a memory; and a processing unit coupled to the memory to perform methods as described herein.

Figure 2:
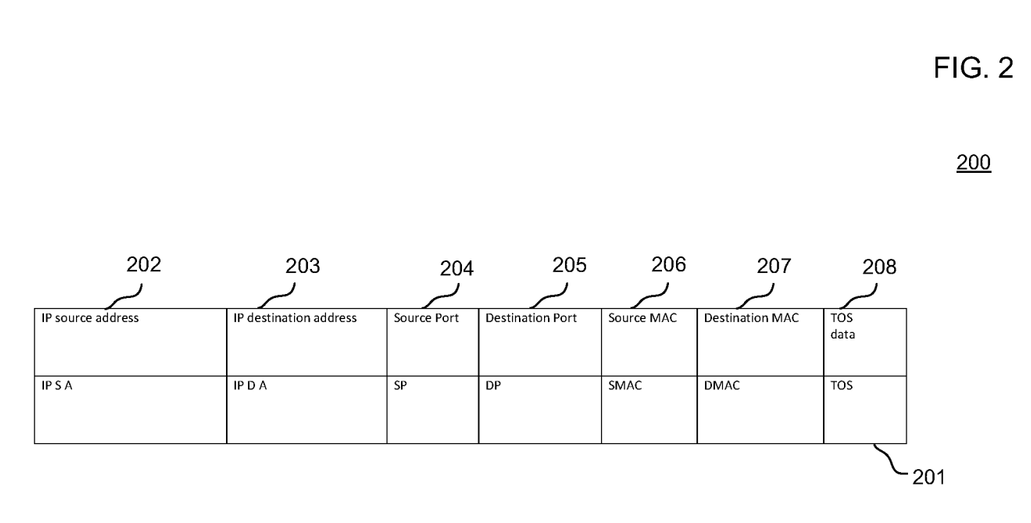
FIG. 2 shows an exemplary diagram 200 illustrating packet header fields received by a network device according to one embodiment of the invention.

FIG. 2 shows an exemplary diagram 200 illustrating packet header fields 201 received by a network device according to one embodiment of the invention. A header of a packet received by the network device can have fields 201 containing information about the packet, such as fields 202, 203, 204, 205, 206, 207, 208, and other fields. For example, field 202 can indicate an IP address of a source device, and field 203 can indicate an IP address of a destination device. For example, field 204 can indicate a port of the source device, and field 205 can indicate a port of the destination device. For example, field 206 can indicate a MAC address of the source device, and field 207 can indicate a MAC address of the destination device, and field 208 can indicate a type of service ("TOS") data, or Differentiated Services Code Point ("DSCP") value.

For at least some embodiments, a flow refers to a stream of data packets between two hosts. For at least some embodiments, the flow is defined uniquely by its five-tuple (source IP address, source port, destination IP address, destination port, protocol type TCP/UDP) from the packet header or any combination thereof. For at least some embodiments, the packet information that defines the flow is expanded to include five-tuple (source IP address, source port, destination IP address, destination port, protocol type TCP/UDP) and other information from the packet header (e.g., media access control ("MAC") addresses, a type of service ("TOS") data, sometimes called a Differentiated Services Code Point ("DSCP") value, other data, or any combination thereof. For at least some embodiments, the flow is uniquely defined at a given time. For example, two concurrent, on the same network flows are considered different flows as being defined by different data from the packet header. For one embodiment, the port numbers are used to demultiplex the flows to find the application that has a corresponding port from which to read open (e.g., UDP port). So every time a packet comes in, a network device knows to what flow this packet belongs.

Typically, a Transmission Control Protocol ("TCP") flow has a defined start and end by the protocol definition. Typically, a User Datagram Protocol ("UDP") flow is defined as a first packet arrives, and the flow end is defined as a time period that elapses with no data exchange on the flow. Typically, a UDP flow is considered a non-congestion controlled flow.

Figure 3:
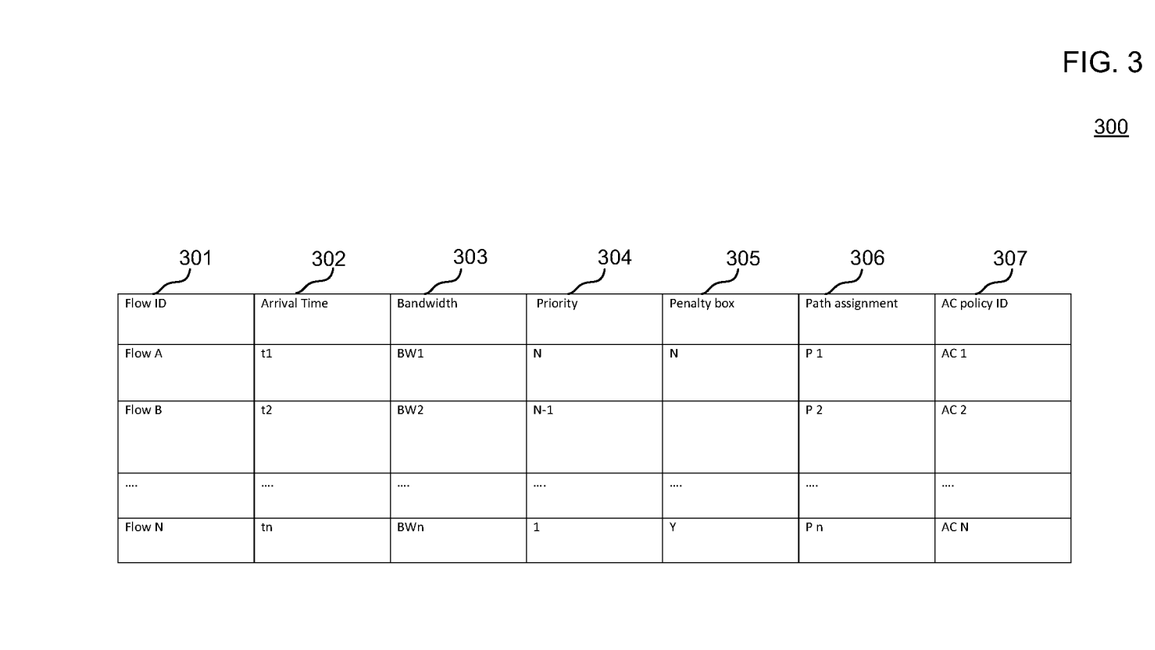
FIG. 3 shows an exemplary data structure stored in a memory containing information about flows received by a network device according to one embodiment of the invention.

FIG. 3 shows an exemplary data structure stored in a memory containing information about flows received by a network device according to one embodiment of the invention. The data structure, such as a data structure 300, contains information about the flows, such as flows A, B, . . . N received by a network device. The data structure can have fields, such as fields 301, 302, 303, 304, 305, 306, 307, and other fields. As shown in FIG. 3, a field 301 shows a flow identifier information ("Flow ID"), and a field 302 shows an arrival time of the flow. A field 303 shows a bandwidth allocated for the flow. A field 304 shows a priority rank for the flow (1 . . . N). A field 305 indicates whether or not the flow is in a penalty box. A field 306 indicates a path assignment for the flow. For example, the network device can provide multiple paths through the network to get to a destination location. For one embodiment, a mapping policy determines which way we map the flow based on its AC policy. For example, the flow having a high priority can be mapped to a better path than the flow having a lower priority.

For at least some embodiments, a pointer is created to indicate at least one of a path, an AC policy, a priority rank assigned to a flow, and an amount of bytes and packets sent by the flow, a number of times the flow is to be re-routed, various time statistics as to when the flow was last re-routed, when the flow started, when the flow was put in a penalty box, if the flow is in the box, a number of times the flow has been to the penalty box and a large numbers of statistics, for example, regarding the data that the network device has seen from the flow.

A field 307 shows an AC policy identifier for the flow. For one embodiment, the data structure has a field indicating the last time when a packet is seen on the network device (not shown). For at least some embodiment, the data structure has an out-of-band ("OOB") data field. For one embodiment, during a video call set up, the UDP port numbers which are used to send a video data flow during a video call are identified on a TCP connection, and the AC policy for the video flow is identified based on the UDP port numbers and OOB data. For example, if a UDP port N is identified, and a user's computer is set up to the TCP flow UDP port N, the AC policy is applied to the video flow based on the TCP port N because from the OOB data it is determined that the flow is a video call.

For at least some embodiments, the flow set data structure is an ordered list. For at least some embodiments, the flow set data structure is a hash table. As shown in field 304, a priority rank is assigned to each flow. For example, flow A is assigned a priority rank N higher than a priority rank 1 of flow N. For one embodiment, the priority rank is more important than the arrival time, if the overall bandwidths used by the flows becomes greater than a threshold for a network device. For example, Flow A can get a bandwidth according to the AC policy, and Flow N can be blocked or assigned a different path even though the arrival time t1 of flow A is later than the arrival time tN of Flow N. That is, when there's only a limited bandwidth is available and the AC policy says that one flow has higher priority than other flow, the flow having higher priority gets its bandwidth first and the rest of the bandwidth goes over to the other flow.

For one embodiment the network device uses a data structure, e.g., data structure as shown in FIG. 3 that tracks each flow. For example, when first packets come a session containing a virtual circuit path is created for the flow to track what is going through the network device, e.g., how many bytes it received by the device, how many bytes is going out of the device, and the like.

For one embodiment, if the network device determines that currently only a portion of the available bandwidth is being used, the network device can allow passing more flows through the network device. If the network device determines that all available bandwidth is being used, and the flows have the same priority, the flows that came earlier are provided their bandwidths, and the flows that come later are blocked until the earlier flow is terminated.

Figure 4:
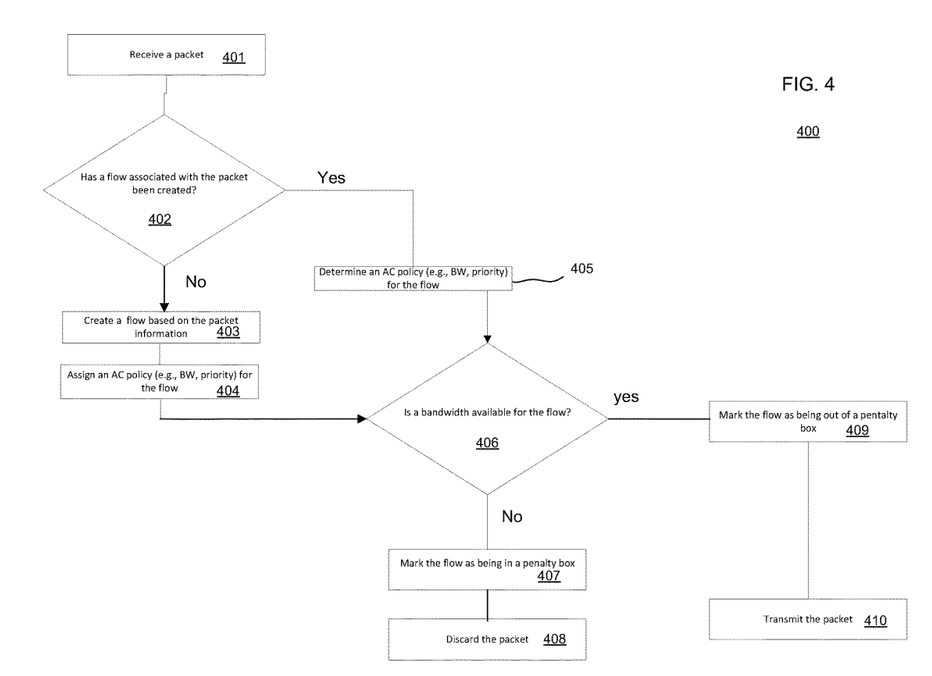
FIG. 4 shows a flow chart of an exemplary method to control non-congestion controlled flows according to one embodiment of the invention.

FIG. 4 shows a flow chart of an exemplary method 400 to control non-congestion controlled flows according to one embodiment of the invention. Method 400 begins at operation 401 that involves receiving a packet. For at least some embodiments, the packet has a header containing information about the packet. The header can be a header as described herein in FIG. 2. For one embodiment, the network device receives a packet and determines a flow associated with the packet. For at least some embodiments, the flows are defined by a packet header information including an Internet Protocol ("IP") source address, an IP destination address, a source port address, a destination port address; a Media Access Control ("MAC") source address, a MAC destination address; and type of service ("TOS") data sometimes called a Differentiated Services Code Point ("DSCP") value, other packet header data, or any combination thereof.

At operation 402 it is determined whether a session for a flow associated with the received packet has been created. For example, the packet header information is used to search for a corresponding flow in a flow set data structure as described in FIG. 3.

For at least some embodiments, the data structure, such as data structure 300 is searched to determine if a flow corresponding to the received packet exists. If the flow is not found, a new flow session needs to be created. If the new flow session is created, then an AC policy and a flow ID are assigned to the new flow. The flow ID and the AC policy and other flow data are stored in the data structure, e.g., data structure 300 to track with other flows stored in the structure. In that process, once the session is opened, flow tracking built, then the network device can look at the AC policy that is applied to the flow and determine how much bandwidth the flow is allowed to have, and can the received packet associated with this flow be forwarded to a destination. If the bandwidth is available for the flow, the packet is forwarded. If the bandwidth is not available for the flow the packet is dropped. For one embodiment, the flow session is marked as being inside the penalty box. For the flow session marked as being in the penalty box, every packet that comes for that flow session is dropped. For one embodiment, an available bandwidth for the flow is checked periodically, for example, every 15 milliseconds, every 50 milliseconds, or every other number of units of time. For one embodiment, a period of time between checking an available bandwidth for the flow is configurable. After a period of time, if it is determined that there is enough bandwidth for the flow, the flow session is unmarked as being in the penalty box. For one embodiment, unmarking the flow session marks the flow session as being out of the penalty box. For the flow session marked as being out of the penalty box, every packet that comes for that flow session is forwarded to a destination.

Referring back to FIG. 4, if it is determined that the session for the flow has not been created (e.g., the flow is not in the flow set data structure), at operation 403 the session for the flow is opened and the flow identifier is created and stored in the flow set data structure based on the packet header information. At operation 404 an AC policy including at least one of a bandwidth and a priority rank is assigned to the created flow. For one embodiment, the AC policy ID is stored in the flow set data structure, as described herein. If it is determined that the session for the flow has already been created, at operation 405 an AC policy is determined based on the flow. For example, the AC policy identifier for the flow can be determined from the flow set data structure as described herein. For one embodiment, the flow identifier is used to run through Radix trie or Patricia trie algorithms to look up for an AC policy that needs to be applied to the flow. The Radix trie or Patricia trie algorithms are prior art algorithms known to one of ordinary skill in the art of computer programming.

For one embodiment, the network device determines an AC policy for the flow. For at least some embodiments, the network device assigns an AC policy to the flow. For at least some embodiments, the AC policy includes at least one of a bandwidth allocated for the flow and a priority rank for the flow. The bandwidth allocated for the flow can be in terms of a relative bandwidth (e.g., a percentage of an overall bandwidth for a network device), in terms of a bandwidth unit (e.g., megabit, gigabit, megabit/sec, gigabit/sec, and the like), or a combination thereof. For example, an AC policy can allow one flow to use 20 percent of the overall bandwidth for a network, and can allow another flow to use 30 percent of the overall bandwidth for a network. For at least some embodiments, an AC policy can be determined based on one or more of the following: IP source/destination addresses, source/destination port addresses, source/destination MAC addresses.

At operation 406 it is determined whether a bandwidth is available for the flow. For at least some embodiments, a network device monitors and measures end-to-end bandwidths available for the flows for network connections, matches the bandwidths against AC policies for the flows, to determine how much of an overall bandwidth the flow can use at a current time.

If the bandwidth is available for the flow, the flow is marked as being out of a penalty box (allowed for transmission) at operation 409. The packet is transmitted at operation 410. If the bandwidth is not available for the flow, the flow is marked as being in a penalty box (not allowed for transmission) at operation 407. At operation 408 the packet is discarded.

Figure 5:
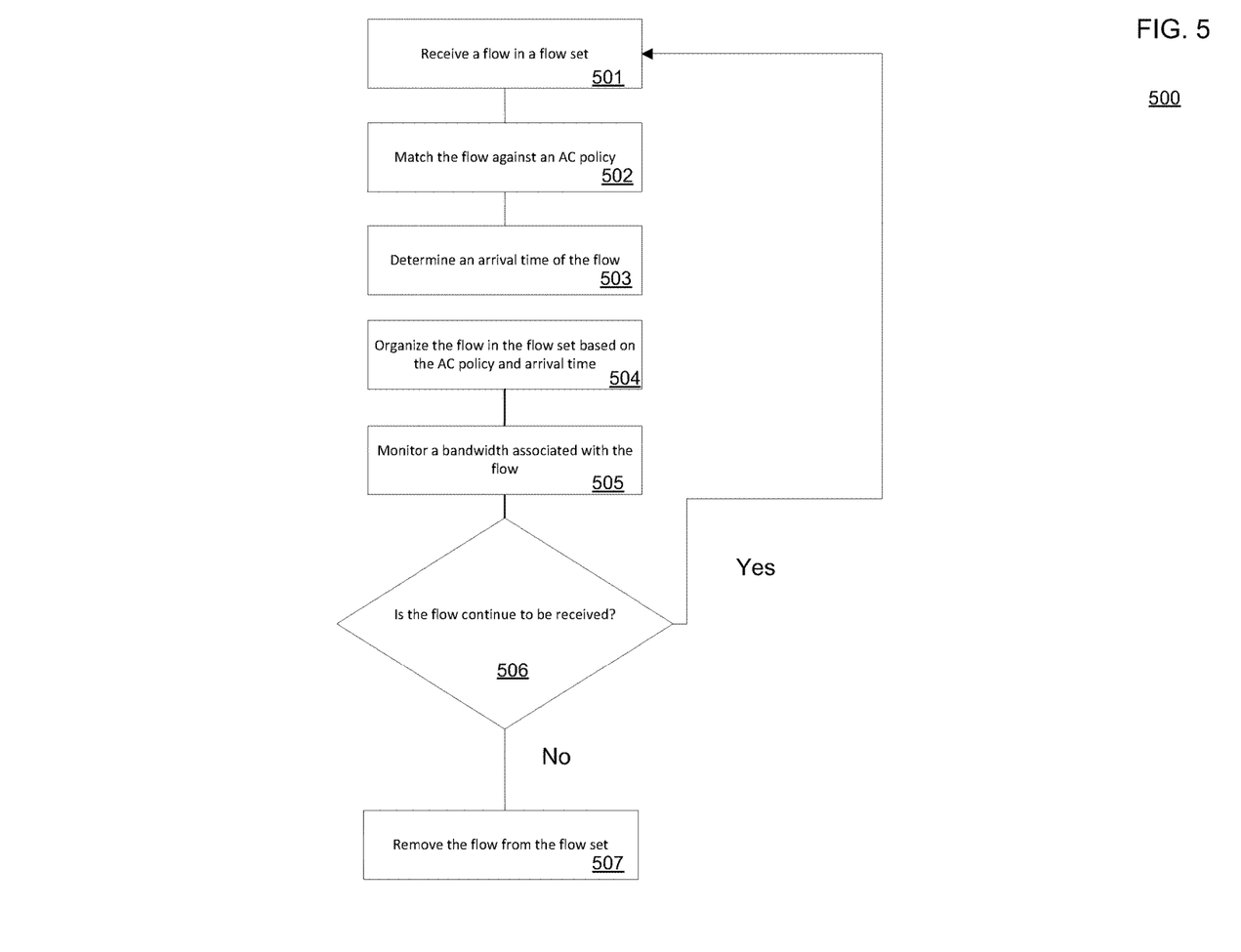
FIG. 5 shows a flow chart of an exemplary method to control non-congestion controlled flows according to another embodiment of the invention.

FIG. 5 shows a flow chart of an exemplary method 500 to control non-congestion controlled flows according to another embodiment of the invention. Method 500 begins at operation 501 that involves receiving a flow in a flow set. At operation 502 the flow is matched against an AC policy. At operation 503 an arrival time is determined for the flow. At operation 504 the flow is organized in the flow set based on the AC policy and arrival time. For at least some embodiments, the network device organizes the flow in a flow set based at least on the AC policy. For at least some embodiments, the network device matches the flow sets against their priority ranks and assigned AC policies. Then the network device tracks each flow in the flow-set by its AC policy. For at least some embodiments, the network device determines an arrival time for the flow; and organizes the flow in the flow set based on the arrival time. For example, a flow that arrives first is placed by the network device at the beginning of a flow set data structure (e.g., list) stored in the memory, and the flows arriving later than the first flow are placed after the first flow in an order towards the end of the flow set data structure. For at least some embodiments, each flow in the data structure is marked with its arrival time.

At operation 505 a bandwidth associated with the flow is monitored. For at least some embodiments, the bandwidth associated with the flow is at least one of the bandwidth that is available going to a destination and the bandwidth is being used by the flow.

At operation 506 it is determined whether the flow continues to be received. If it is determined that the flow is not received, at operation 507 the flow is removed from the flow set. For example, the flow is removed from the flow set data structure, as described in FIG. 3. For at least some embodiments, the network device dynamically removes the flow from the flow set. For example, as a flow exits from the network device, or stops arriving, that flow is removed from the flow-set. For example, the flow can be removed, if the flow is not received by a network device for a period of time. For one embodiment, this period of time is configurable, and can be, e.g., two seconds, or any other period of time. After the period of time, if the network device does not receive packets associated with the flow, the flow is removed. If the flow continues to be received, method 400 returns to operation 501.

For at least some embodiments, the network device monitors a bandwidth for the flow. For example, the overall bandwidth being used by each flow is tracked within its session. For at least some embodiments, the network device marks the flow for transmission based on monitoring the bandwidth for the flow. For example, a first flows comes into a network device, the bandwidth used by the first flow is monitored, if it is determined that the bandwidth used by the first flow is less than a flow set bandwidth assigned by an AC policy to a network device, a second flow is added and is given its bandwidth according the second flow AC policy. As flows are added, the overall bandwidth used by each of the flows is monitored, and later coming flows are given their AC policy assigned bandwidths, if the overall bandwidth used by the flows is less than the bandwidth for the network device. If the overall bandwidth used by the flows becomes greater than the bandwidth for the network device, the later coming flows start being blocked until one of the earlier coming flows terminates and goes away. For at least some embodiments, if the flow is not received by the network device during a predetermined time interval, the flow is considered as being terminated.

Figure 6:
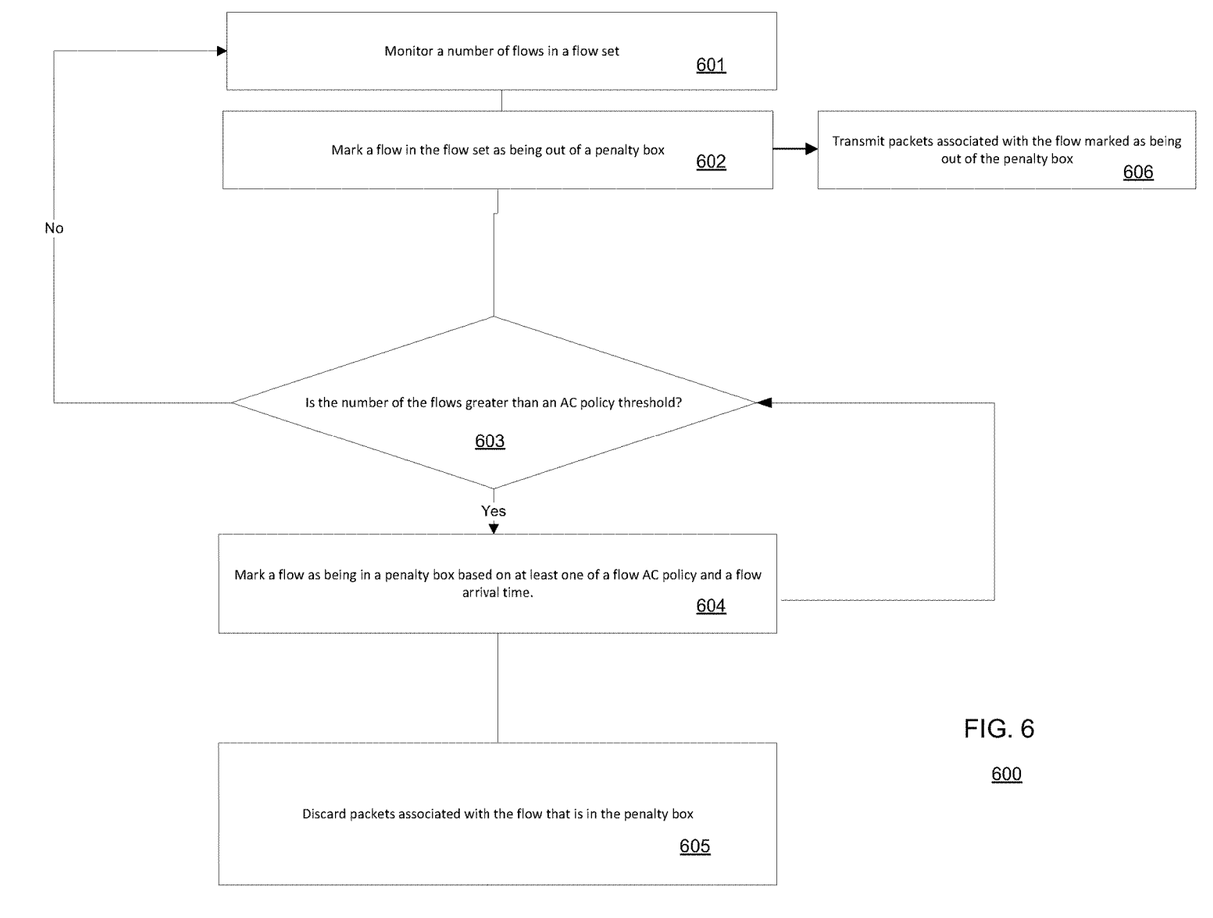
FIG. 6 shows a flow chart of an exemplary method to control non-congestion controlled flows according to yet another embodiment of the invention.

FIG. 6 shows a flow chart of an exemplary method 600 to control non-congestion controlled flows according to yet another embodiment of the invention. Method 600 begins with operation 601 involving monitoring a number of flows in a flow set. For at least some embodiments, the network device monitors a number of flows in a flow set, matches the number of flows against an access control ("AC") policy, and transmits a packet associated with the flow based at least on the AC policy, as described in further detail below. For at least some embodiments, the network device determines an arrival time for a flow in the flow set, and transmits the packet based on the arrival time, as described herein. For at least some embodiments, the network device marks a flow in the flow set for transmission, as described in further detail below.

At operation 602 a flow in the flow set is marked as being out of a penalty box (allowed for transmission). At operation 606 the packets associated with the flow marked as being out of the penalty box are transmitted. At operation 603 it is determined is the number of the flows in the flow set greater than an AC policy threshold. At operation 604 a flow is marked as being in a penalty box (not allowed for transmission) based at least on one of an AC policy assigned to the flow and a flow arrival time. At operation 605 packets associated with the flow marked as being in the penalty box are discarded. Unlike existing techniques, dropping of the packets as described herein is performed based on AC policies. For at least some embodiments, operations 601-603 are continuously repeated after a user configurable period of time.

For at least some embodiments, the network device monitors a bandwidth for the flow set, and discards the packet based on monitoring. For example, the network device periodically compares the bandwidth being used by the flow-set to its AC policy. If the flow-set is using more bandwidth then allowed by policy then the network device can do the following:

a. Walk through a list of flows stored in a memory, examining the flows use and totaling the used so far. Marking the flow as being out of a penalty box for transmission. For at least some embodiments, the penalty box as described herein is a virtual penalty box.
 b. When the total number of flows reaches the maximum for the policy, the network device marks all the rest of the flows as in the virtual penalty box for discard. This check is repeated periodically causing the flows to come in or out of the penalty box based on how many flows there are and their usage.

When a flow is in the penalty box, all of its packets as they forward through the network device are dropped. If a flow is not in the penalty box, then its packets are allowed to proceed.

For example, on the non-congestion controlled flows a network device determines an amount of bandwidth is currently used by the flows and how many of the flows are actively transmitting the packets to determine how much each of the flow is going to be using. For example, if there are five flows actively transmitting packets and there are 30 megabits of the bandwidths being used, so on average each of those five flows is using six megabits. For example, if the network device only has 30 megabits of bandwidth available and an additional flow enters, the network device knows that it does not have available bandwidth for the additional flow, because the additional flow is going to use an average six megabits. If there is no bandwidth for the additional flow, the network device puts the additional flow into the penalty box. If after a period of time the network device determines that the existing flows slowed down and each use an average of e.g., 3 megabits, the additional flow is marked as being taken out of the penalty box.

Figure 7:
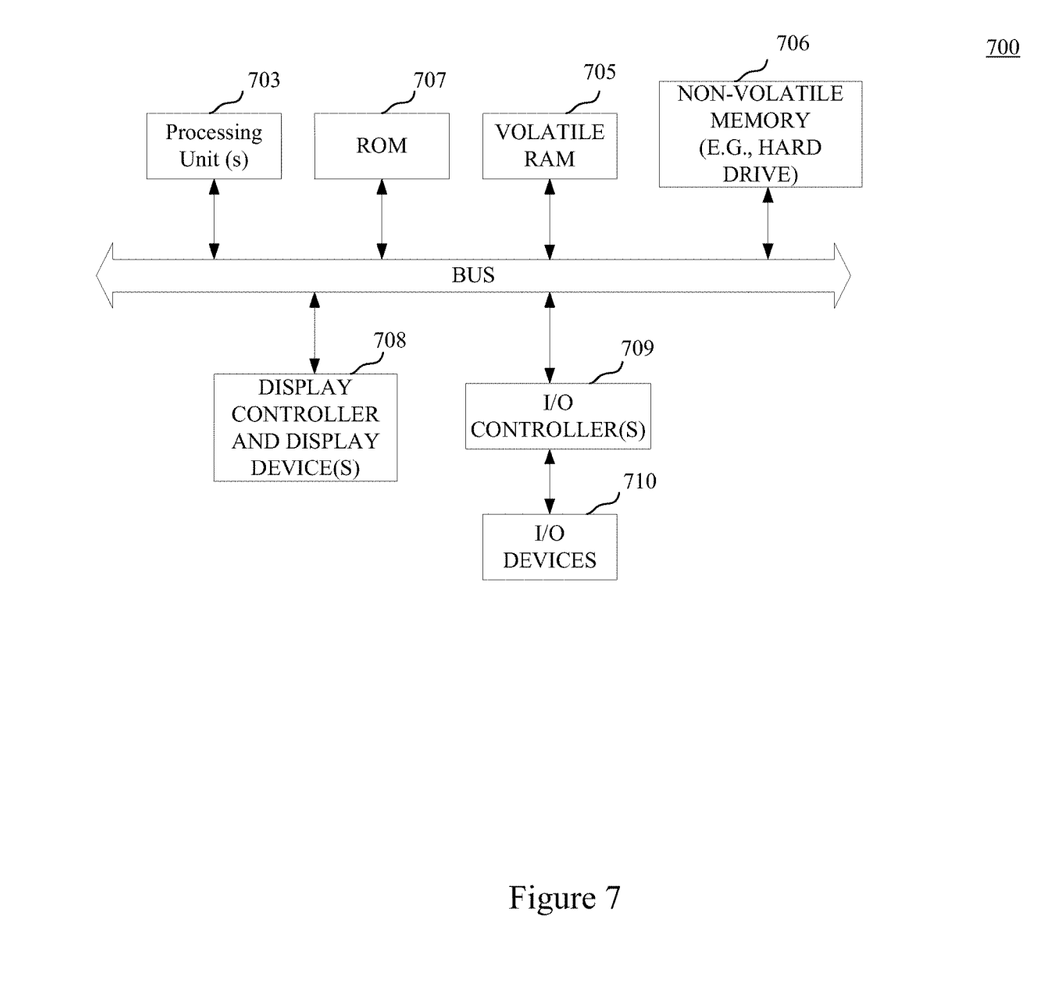
FIG. 7 shows an example of a data processing system to control non-congestion controlled flows according to one embodiment of the invention.

FIG. 7 shows an example of a data processing system to control non-congestion controlled flows according to one embodiment of the invention. For one embodiment, the data processing system 700 is a network device that forwards data between endpoint devices, for example, a router, gateway, or a switch. Additional components, not shown, are a part of the data processing system 700. For example, one embodiment of the data processing system 700 includes port adapters or other modular interface controllers that contain circuitry to transmit and receive packets on physical media.

Note that while FIG. 7 illustrates various components of a computer system, it is not intended to represent any particular architecture or manner of interconnecting the components as such details are not germane to the embodiments of the present invention. It will also be appreciated that network computers and other data processing systems which have fewer components or perhaps more components may also be used with the embodiments of the present invention.

Generally, a network refers to a collection of computers and other hardware components interconnected to share resources and information. Networks may be classified according to a wide variety of characteristics, such as the medium used to transport the data, communications protocol used, scale, topology, and organizational scope. Communications protocols define the rules and data formats for exchanging information in a computer network, and provide the basis for network programming. Well-known communications protocols include Ethernet, a hardware and link layer standard that is ubiquitous in local area networks, and the Internet protocol ("IP") suite, which defines a set of protocols for internetworking, i.e., for data communication between multiple networks, as well as host-to-host data transfer e.g., Transmission Control Protocol ("TCP"), User Datagram Protocol ("UDP"), and application-specific data transmission formats, for example, Hypertext Transfer Protocol ("HTTP"). Methods and apparatuses described herein can be used for any of networks, protocols, and data formats.

As shown in FIG. 7, the data processing system 700, which is a form of a data processing system, includes a bus 702 which are coupled to one or more processing units 703, a memory including one or more of volatile and non-volatile memories, such as a RAM 705, a ROM 107, a non-volatile memory 706, a solid state disk ("SSD"), Flash, Phase Change Memory ("PCM"), or other types of data storage, and input/output controllers 709.

One or more processing units 703 can include one or more microprocessor(s) and connected system components. For one embodiment, the microprocessor(s) are coupled to separate system components (e.g., multiple connected chips). Alternatively, one or more system components are included with one or more of the microprocessors in a system on a chip.

One or more processing units 703, may include, for example, a G3 or G4 microprocessor from Motorola, Inc. or IBM, may be coupled to a cache memory (not shown) or may include a network processor implemented in a field-programmable gate array ("FPGA"). The memory of the data processing system 700 stores data, metadata, and/or programs for execution by the microprocessor(s). For one embodiment, the memory stores a data structure containing a flow set, e.g., a hash table, a list, or any other data structure, as described in further detail below.

The bus 702 can include one or more buses interconnect various data processing system components together and also connect to a display controller and display device(s) 708 and to input/output ("I/O") devices which may be a mice, keyboards, a modem, I/O interfaces, printers, scanners, video cameras, speakers, and other devices which are well known in the art.

The one or more I/O interfaces are coupled to the bus to allow a user to provide input to, receive output from, and otherwise transfer data to and from the system. The I/O interfaces may also include one or more of an Ethernet port, a fiber optic port, a coaxial cable port, a FireWire port, a Thunderbolt port, a wireless transceiver, etc. to connect the system 700 with another device, an external component, or a network.

Typically, the input/output devices, such as I/O devices 710 are coupled to the system through input/output controllers 709. The volatile RAM 705705 is typically implemented as dynamic RAM ("DRAM") which requires power continually in order to refresh or maintain the data in the memory. The non-volatile memory 706 is typically a magnetic hard drive or a magnetic optical drive or an optical drive or a DVD RAM or other type of memory systems which maintain data even after power is removed from the system. Typically, the non-volatile memory will also be a random access memory although this is not required. For at least some embodiments, data processing system 700 includes a power supply (not shown) coupled to the one or more processing units 703 which may include a battery and/or AC power supplies.

While FIG. 7 shows that the non-volatile memory is a local device coupled directly to the rest of the components in the data processing system, it will be appreciated that the embodiments of the present invention may utilize a non-volatile memory which is remote from the system, such as a network storage device which is coupled to the data processing system through a network interface such as a modem or Ethernet interface. The bus 702 may include one or more buses connected to each other through various bridges, controllers and/or adapters as is well known in the art. For one embodiment, the I/O controller 709 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 705, non-volatile memory 706, or a remote storage device. In various embodiments, hardwired circuitry may be used in combination with software instructions to implement embodiments of the present invention. Thus, the techniques are not limited to any specific combination of hardware circuitry and software nor to any particular source for the instructions executed by the data processing system. In addition, throughout this description, various functions and operations are described as being performed by or caused by software code to simplify description. What is meant by such expressions is that the functions result from execution of the code by one or more processing units 703, e.g., a microprocessor, a field-programmable gate array ("FPGA") and/or a microcontroller.

A non-transitory machine readable medium can be used to store software and data which when executed by a data processing system causes the system to perform embodiments of methods as described herein. This executable software and data may be stored in various places including for example ROM 107, volatile RAM 705, and non-volatile memory 706 as shown in FIG. 7. Portions of this software and/or data may be stored in any one of these storage devices.

Thus, a machine readable medium includes any mechanism that provides (i.e., stores and/or transmits) information in a form accessible by a machine (e.g.; a computer, network device, cellular phone, personal digital assistant, manufacturing tool, any device with a set of one or more processors, etc.). For example, a machine readable medium includes recordable/non-recordable media (e.g., read only memory ("ROM"); random access memory ("RAM"); magnetic disk storage media; optical storage media; flash memory devices; and the like.

The methods of the present invention can be implemented using a dedicated hardware (e.g., using Field Programmable Gate Arrays ("FPGAs"), or Application Specific Integrated Circuit ("ASIC") or shared circuitry (e.g., microprocessors or microcontrollers under control of program instructions stored in a machine readable medium). The methods of the present invention can also be implemented as computer instructions for execution on a data processing system, such as system 700 of FIG. 7. FPGAs typically contain programmable logic components ("logic blocks"), and a hierarchy of reconfigurable interconnects to connect the blocks. In most FPGAs, the logic blocks also include memory elements, which may be simple flip-flops or more complete blocks of memory.

In the foregoing specification, embodiments of the invention have been described with reference to specific exemplary embodiments thereof. It will be evident that various modifications may be made thereto without departing from the broader spirit and scope of the embodiments of the invention. The specification and drawings are, accordingly, to be regarded in an illustrative sense rather than a restrictive sense.

What is claimed is:

1. A machine-implemented method, comprising:
receiving a packet;
identifying a flow comprising a plurality of packets based on the received packet;
identifying an access control ("AC") policy based on the flow, wherein the AC policy comprises a priority rank of the flow relative to other flows in a flow set;
tracking the flow in the flow set by at least the identified AC policy;
marking the flow as being out of a virtual penalty box, if a bandwidth for the flow is available, wherein for the flow that is marked as being out of the virtual penalty box, every packet is forwarded to a destination; and
marking the flow as being in the virtual penalty box, if the bandwidth for the flow is not available, wherein for the flow that is marked as being in the virtual penalty box, every packet is dropped.

2. The method of claim 1, further comprising
assigning the access control policy to the flow.

3. The method of claim 1, further comprising
monitoring the bandwidth for the flow, wherein
the flow comes in and out of the virtual penalty box based on the monitoring.

4. The method of claim 1, wherein the AC policy is further associated with the bandwidth.

5. The method of claim 1, wherein the flow is defined based on at least one of an Internet Protocol ("IP") source address, an IP destination address, a source port address, a destination port address; a Media Access Control ("MAC") source address, a MAC destination address; and type of service ("TOS") data.

6. The method of claim 1, further comprising
determining an arrival time for the flow; and
organizing the flow in the flow set based on the arrival time.

7. The method of claim 1, further comprising
removing the flow from the flow set.

8. A machine-implemented method to control non-congestion controlled flows, comprising:
monitoring a number of flows in a flow set, wherein each of the flows that comprises a plurality of packets is identified by a unique identifier;
matching the number of flows against an access control ("AC") policy threshold number;
if the number of flows is greater than the AC polity threshold number, marking a flow as being in a virtual penalty box based on a priority rank of the flow relative to other flows in the flow set;
dropping a packet associated with the flow that has been marked as being in the penalty box; and
marking the flow as being out of the virtual penalty box, if a bandwidth for the flow is available, wherein for the flow that is marked as being out of the virtual penalty box, every packet is forwarded to a destination.

9. The method of claim 8, wherein the flow comes in and out of the virtual penalty box based on the monitoring.

10. The method of claim 8, further comprising
determining an arrival time for a flow in the flow set, wherein the packet is transmitted based on the arrival time.

11. The method of claim 8, further comprising discarding the packet.

12. The method of claim 8, wherein the flows are defined based on at least one of an Internet Protocol ("IP") source address, an IP destination address, a source port address, a destination port address; a Media Access Control ("MAC") source address, a MAC destination address, and type of service ("TOS") data.

13. The method of claim 8, wherein the AC policy is further associated with the bandwidth.

14. The method of claim 8, further comprising monitoring the bandwidth for the flow set.

15. A non-transitory machine readable storage medium that has stored instructions which when executed cause a data processing system to perform operations comprising:
receiving a packet;
identifying a flow comprising a plurality of packets based on the received packet;
identifying an access control ("AC") policy based on the flow, wherein the AC policy comprises a priority rank of the flow relative to other flows in a flow set;
tracking the flow in the flow set by at least the identified AC policy;
marking the flow as being out of a virtual penalty box, if a bandwidth for the flow is available, wherein for the flow that is marked as being out of the virtual penalty box, every packet is forwarded to a destination; and
marking the flow as being in the virtual penalty box, if the bandwidth for the flow is not available, wherein for the flow that is marked as being in the virtual penalty box, every packet is dropped.

16. The non-transitory machine readable storage medium of claim 15, further comprising
instructions which when executed cause the data processing system to perform operations comprising
assigning the access control policy to the flow.

17. The non-transitory machine readable storage medium of claim 15, further comprising
instructions which when executed cause the data processing system to perform operations comprising
monitoring the bandwidth for the flow, wherein
the flow comes in and out of the virtual penalty box based on the monitoring.

18. The non-transitory machine readable storage medium of claim 15, wherein the AC policy is further associated with the bandwidth.

19. The non-transitory machine readable storage medium of claim 15, wherein the flow is defined based on at least one of an Internet Protocol ("IP") source address, an IP destination address, a source port address, a destination port address; a Media Access Control ("MAC") source address, a MAC destination address, and type of service ("TOS") data.

20. The non-transitory machine readable storage medium of claim 15, further comprising:
instructions which when executed cause the data processing system to perform operations comprising:
determining an arrival time for the flow; and
organizing the flow in the flow set based on the arrival time.

21. The non-transitory machine readable storage medium of claim 15, further comprising:
instructions which when executed cause the data processing system to perform operations comprising
removing the flow from the flow set.

22. A non-transitory machine readable storage medium that has stored instructions which when executed cause a data processing system to perform operations to control non-congestion controlled flows, comprising:
monitoring a number of flows in a flow set, wherein each of the flows that comprises a plurality of packets is identified by a unique identifier;
matching the number of flows against an access control ("AC") policy threshold number;
if the number of flows is greater than the AC polity threshold number, marking a flow as being in a virtual penalty box based on a priority rank of the flow relative to other flows in the flow set;
dropping a packet associated with the flow that has been marked as being in the penalty box; and
marking the flow as being out of the virtual penalty box, if a bandwidth for the flow is available, wherein for the flow that is marked as being out of the virtual penalty box, every packet is forwarded to a destination.

23. The non-transitory machine readable storage medium of claim 22, wherein the flow comes in and out of the virtual penalty box based on the monitoring.

24. The non-transitory machine readable storage medium of claim 22, further comprising:
instructions which when executed cause the data processing system to perform operations comprising:
determining an arrival time for a flow in the flow set, wherein the packet is transmitted based on the arrival time.

25. The non-transitory machine readable storage medium of claim 22, further comprising:
instructions which when executed cause the data processing system to perform operations comprising:
discarding the packet.

26. The non-transitory machine readable storage medium of claim 22, wherein the flows are defined based on at least one of an Internet Protocol ("IP") source address, an IP destination address, a source port address, a destination port address; a Media Access Control ("MAC") source address, a MAC destination address, and type of service ("TOS") data.

27. The non-transitory machine readable storage medium of claim 22, wherein the AC policy is further associated with the bandwidth.

28. The non-transitory machine readable storage medium of claim 22, further comprising:
instructions which when executed cause the data processing system to perform operations comprising monitoring the bandwidth for the flow set.

29. An apparatus comprising:
a memory; and
a processing unit coupled to the memory, wherein the processing unit is configured:
to receive a packet;
to identify a flow comprising a plurality of packets based on the received packet;
to identify an access control ("AC") policy based on the flow, wherein the AC policy comprises a priority rank of the flow relative to other flows in a flow set;
to track the flow in the flow set by at least the identified AC policy;
to mark the flow as being out of a virtual penalty box, if the bandwidth for the flow is not available, wherein for the flow that is marked as being out of the virtual penalty box, every packet is forwarded to a destination, and
to mark the flow as being in the virtual penalty box, if the bandwidth for the flow is not available, wherein for the flow that is marked as being in the virtual penalty box, every packet is dropped.

30. The apparatus of claim 29, wherein the processing unit is further configured to
assign the access control policy to the flow.

31. The apparatus of claim 29, wherein the processing unit is further configured to monitor the bandwidth for the flow wherein the flow comes in and out of the virtual penalty box based on the monitoring.

32. The apparatus of claim 29, wherein the AC policy is further associated with the bandwidth.

33. The apparatus of claim 29, wherein the flow is defined based on at least one of an Internet Protocol ("IP") source address, an IP destination address, a source port address, a destination port address; a Media Access Control ("MAC") source address, a MAC destination address, and type of service ("TOS") data.

34. The apparatus of claim 29, wherein the processing unit is further configured to
determine an arrival time for the flow; and to organize the flow in the flow set based on the arrival time.

35. The apparatus of claim 29, wherein the processing unit is further configured to
remove the flow from the flow set.

36. An apparatus to control non-congestion controlled flows, comprising:
a memory; and
a processing unit coupled to the memory, wherein the processing unit is configured to monitor a number of flows in a flow set, wherein each of the flows that comprises a plurality of packets is identified by a unique identifier; to match the number of flows against an access control ("AC") policy threshold number; if the number of flows is greater than the AC polity threshold number, to mark a flow as being in a virtual penalty box based on a priority rank of the flow relative to other flows in the flow set; and to drop a packet associated with the flow that has been marked as being in the penalty box; and to mark the flow as being out of the virtual penalty box, if a bandwidth for the flow is available, wherein for the flow that is marked as being out of the virtual penalty box, every packet is forwarded to a destination.

37. The apparatus of claim 36, wherein
the flow comes in and out of the virtual penalty box based on the monitoring.

38. The apparatus of claim 36, wherein the processing unit is further configured to
determine an arrival time for a flow in the flow set, wherein the packet is transmitted based on the arrival time.

39. The apparatus of claim 36, wherein the processing unit is further configured to discard the packet.

40. The apparatus of claim 36, wherein the flows are defined based on at least one of an Internet Protocol ("IP") source address, an IP destination address, a source port address, a destination port address; a Media Access Control ("MAC") source address, a MAC destination address, and type of service ("TOS") data.

41. The apparatus of claim 36, wherein the AC policy is further associated the bandwidth.

42. The apparatus of claim 36, wherein the processing unit is further configured to
monitor the bandwidth for the flow set.

\* \* \* \* \*